United States Patent
Sutton

[11] 3,899,215
[45] Aug. 12, 1975

[54] ROAD VEHICLE BRAKING SYSTEM INCORPORATING WHEEL SLIDE PROTECTION

[75] Inventor: Christopher John Sutton, Belgrave, England

[73] Assignee: The Lucas Electrical Company Limited, Birmingham, England

[22] Filed: July 10, 1973

[21] Appl. No.: 377,966

[30] Foreign Application Priority Data
July 14, 1972 United Kingdom............... 32985/72

[52] U.S. Cl............................ 303/21 AF; 340/52 B
[51] Int. Cl.$^2$............................................ B60T 8/08
[58] Field of Search............... 180/82 R; 303/21 AF; 317/18 R, 27 R; 324/51; 340/52 R, 52 B, 248 A, 255

[56] References Cited
UNITED STATES PATENTS

| | | | |
|---|---|---|---|
| 3,277,312 | 10/1966 | Harris............................ | 340/248 A |
| 3,412,389 | 11/1968 | Barrack et al.................. | 340/248 A |
| 3,680,923 | 8/1972 | Peterson et al................. | 303/21 AF |
| 3,707,311 | 12/1972 | Sharp............................. | 303/21 CG |
| 3,740,103 | 6/1973 | Sweet et al.................... | 303/21 AF X |

OTHER PUBLICATIONS

O'Malley, "Voltage Detection Circuit," IBM Technical Disclosure Bulletin, Vol. 3, No. 6, November 1960.

Primary Examiner—Trygve M. Blix
Assistant Examiner—Stephen G. Kunin
Attorney, Agent, or Firm—Holman & Stern

[57] ABSTRACT

A road vehicle braking system with wheel slide protection has a sensor which produces an a.c. signal at a frequency dependent on the rotational speed of a vehicle wheel. This signal is fed by way of a frequency voltage converter to a differentiating circuit to produce an output dependent on the rotational deceleration of the wheel, this output then being used to release the brakes when the rotational deceleration exceeds a predetermined value. Monitoring apparatus is provided to test the sensor and in the event of a fault to prevent releasing of the brakes during a subsequent braking operation.

3 Claims, 11 Drawing Figures

FIG.10 ically, the outputs of the sensors are compared
ROAD VEHICLE BRAKING SYSTEM INCORPORATING WHEEL SLIDE PROTECTION This invention relates to road vehicle braking systems incorporating wheel slide protection.

A system according to the invention comprises in combination a sensor producing an a.c. signal at a frequency dependent on the rotational speed of a vehicle wheel, a frequency to voltage converter for producing from said signal a d.c. signal dependent on said rotational speed, a differentiating circuit to which the d.c. signal is fed, the differentiating circuit producing an output dependent on the rotational deceleration of said wheel, means operable by the differentiating circuit output for releasing the brakes applied to said wheel when the wheel deceleration exceeds a predetermined value, and monitoring means operable to test said sensor, and in the event of a fault to prevent releasing of the brakes during a subsequent braking operation.

Preferably, there are at least two sensors associated with two wheels of the vehicle respectively, and the monitoring means operates by comparing the outputs of the sensors with each other. In the preferred arrangement, the outputs of the sensors are compared with each other by sampling the outputs of the frequency to voltage converters associated with the pair of sensors respectively. Conveniently, the outputs from the converters are applied to a bridge network which produces an output when the outputs from the converters are not equal. This arrangement can be used with more than two sensors by providing further inputs to the bridge network, so that if any two inputs to the bridge network differ in potential by a predetermined amount, the bridge network produces an output. Moreover one sensor can be tested in this way by providing a fixed reference with which the converter output is compared.

In the preferred arrangement, the sensing is continuous but the monitoring means only operates when the brakes are off.

An example of the invention is illustrated in the accompanying drawings, in which.

Figure 1:
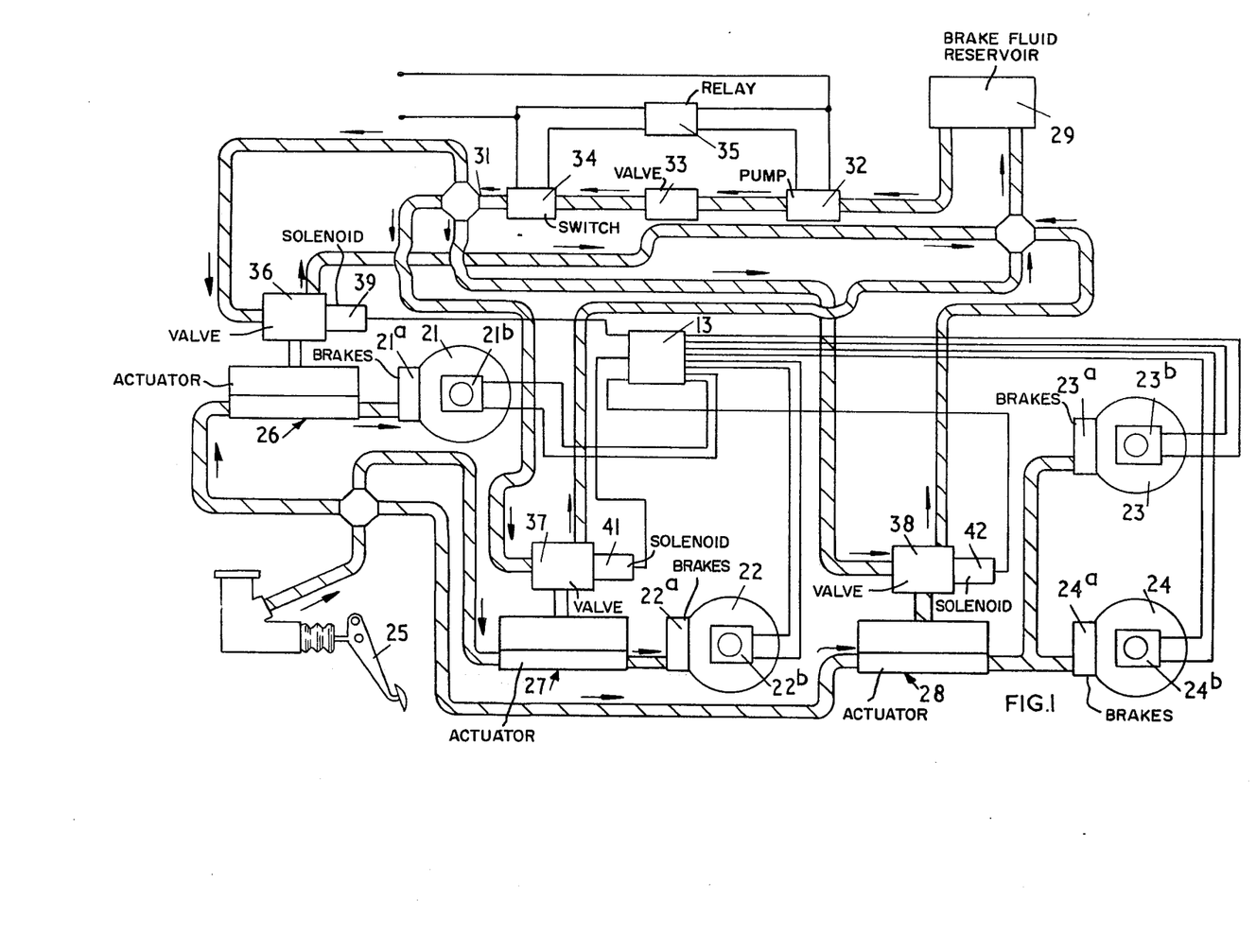
FIG. 1 is a block diagram of the braking system showing the hydraulic and electrical arrangements.

Referring first to FIG. 1, the four wheels of the vehicle are indicated diagrammatically, the front wheels being shown at 21 and 22, and the rear wheels at 23 and 24. The brakes associated with each wheel are indicated with the number of the wheel followed by the reference numeral a, and additionally, each wheel has associated therewith a sensor for producing a signal at a frequency proportional to the rotational speed of its wheel. The sensors are indicated with the number of the wheel followed by the reference numeral b.

When the brake pedal 25 of the road vehicle is depressed, brake fluid is supplied to the brakes on the front wheels 21, 22 through actuators 26 and 27 respectively, and brake fluid is supplied to both rear wheel brakes through an actuator 28. When the wheel slide prevention system is not in operation, the actuators 26, 27 and 28 play no part in the operation of the circuit, and it can be assumed that the brake fluid flows directly to the respective brakes.

The wheel slide protection system includes a brake fluid reservoir 29 which supplies brake fluid to a supply line 31 by way of an electric pump 32, a non-return valve 33 and a pressure switch 34. The pressure switch 34 controls a relay 35 which in turn controls operation of the pump 32, so that a substantially constant pressure is maintained on the supply line 31. The line 31 feeds the inlet of three control valves 36, 37, 38 associated with the actuators 26, 27 and 28 respectively. The valves 36, 37 and 38 have associated therewith respectively solenoids 39, 41, 42 which are controlled by an electronic control device 43 which receives inputs from the sensors 21b, 22b, 23b and 24b.

As explained, when the wheel slide protection system is not in operation, the brakes are applied in the usual manner. However, in some circumstances (to be described) one of the solenoids will be energised. Suppose for example that the front wheel 21 is about to slip, then the electronic control device 43 feeds a signal to the solenoid 39 to energise the solenoid 39 and operate the valve 36. The valve 36 serves when it is operated to control the actuator 26 so that brake fluid is cut off from the brakes 21a, and at the same time a chamber within the actuator 26 through which brake fluid is applied to the brakes 21a is increased in volume, so that the brakes are released from the wheel 21. The brakes can be released in a similar manner from the other front wheel 22, but in the case of the rear wheels, the arrangement shown releases the brakes from both rear wheels 23, and 24 if either of the rear wheels is about to slip.

Figure 2:
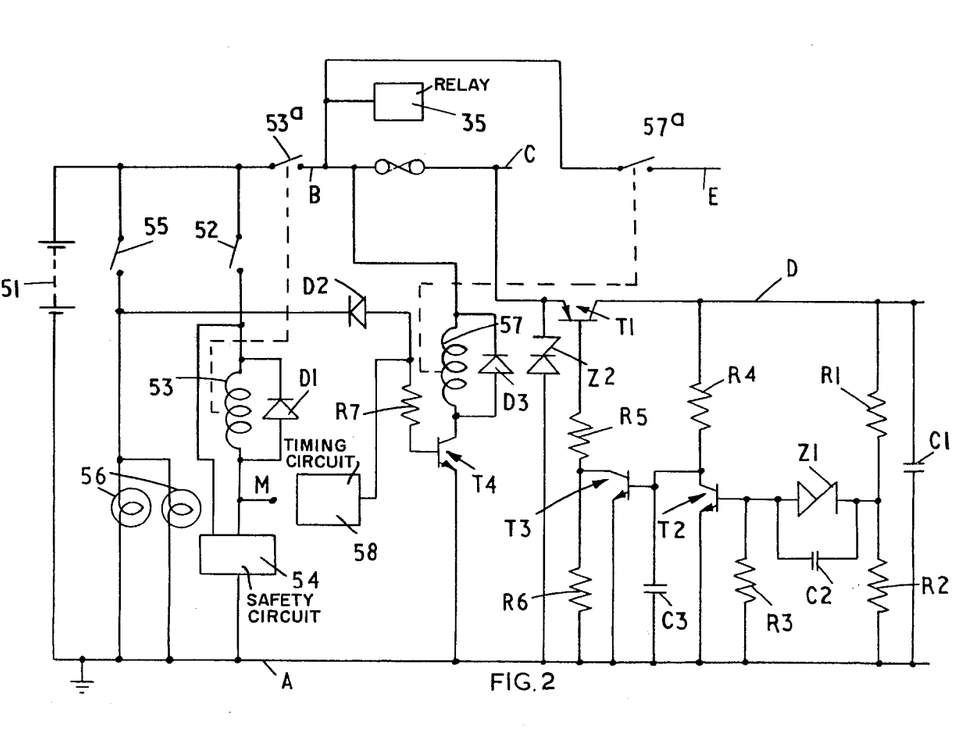
FIG. 2 is a circuit diagram illustrating the power supply arrangements.

FIG. 2 shows the power supply arrangements for the entire system. The vehicle battery 51 has its negative terminal connected to a supply line A which is earthed. The positive terminal of the battery 51 is connected through the vehicle ignition switch 52 to one end of a relay winding 53 bridged by a diode D1. The other end of the winding 53 is connected to the line A through a safety circuit 54 which is connected across the battery 51 through the switch 52 and which receives inputs from a number of points in the system, as will be described later. When there are no faults in the system, then the safety circuit 54 provides a path to the supply line A for the winding 53, so that the winding 53 is energised provided that the ignition switch 52 is closed. The winding 53 when energised closes a normally open contact 53a which connects the positive terminal of the battery to a supply line B. There is a further positive supply line C which has the same potential as the line B but is connected to it through a fuse 50, and the line C is further connected to the emitter of a p-n-p transistor T1, the collector of which is connected to a further positive supply line D which in a 12 volt system is regulated to a potential of 10 volts in a typical example.

The lines D, A are interconnected by a pair of resistors R1, R2 in series, and also by a capacitor C1. The junction of the resistors R1, R2 is connected to the base of an n-p-n transistor T2 through a Zener diode Z1 and a capacitor C2 in parallel, the base of the transistor T2 being further connected to the line A through a resistor R3. The emitter of the transistor T2 is connected to the line A, and its collector is connected through a resistor R4 to the line D, and also to the base of an n-p-n transistor T3. The transistor T3 has its base connected to the line A through a capacitor C3, and its collector connected through a resistor R5 to the base of the transistor T1, and through a resistor R6 to the line A. The emitter of the transistor T3 is connected to the line A.

The transistor T3 provides base current to the transistor T1, and so controls the conduction of the transistor T1. Conduction of the transistor T3 is controlled by the transistor T2, and when the voltage on the line D increases beyond 10 volts, increased base current flows in the transistor T2 to remove base current from the transistor T3, so that less base current flows to the transistor T1 and the potential on the line D falls. If the potential on the line D falls below 10 volts, then the resultant decreasing base current of the transistor T2 increases the base current to the transistor T3, and so increases the conduction of the transistor T1.

FIG. 2 also shows the vehicle brake switch 55, which is connected across the battery 51 in series with the brake lamps 56 of the vehicle, the lamps 56 being connected in parallel. The junction of the switch 55 and lamps 56 is connected through a diode D2 and a resistor R7 in series to the base of an n-p-n transistor T4, the emitter of which is connected to the line A and the collector of which is connected to the line B through a relay winding 57 bridged by a diode D3. The winding 57 serves whenever it is energised to close a normally open contact 57a which is connected between the supply line B and a further positive supply line E. Thus, the line E is only energised when the transistor T4 conducts. The transistor T4 is conductive not only when the switch 55 closes, but also for a brief period of time when a timing circuit 58 is energised in a manner to be described. All the positive supply lines B, C, D and E are under the control of the relay 53.

The emitter of the transistor T1 is connected to the line A through a Zener diode Z2.

Figure 3:
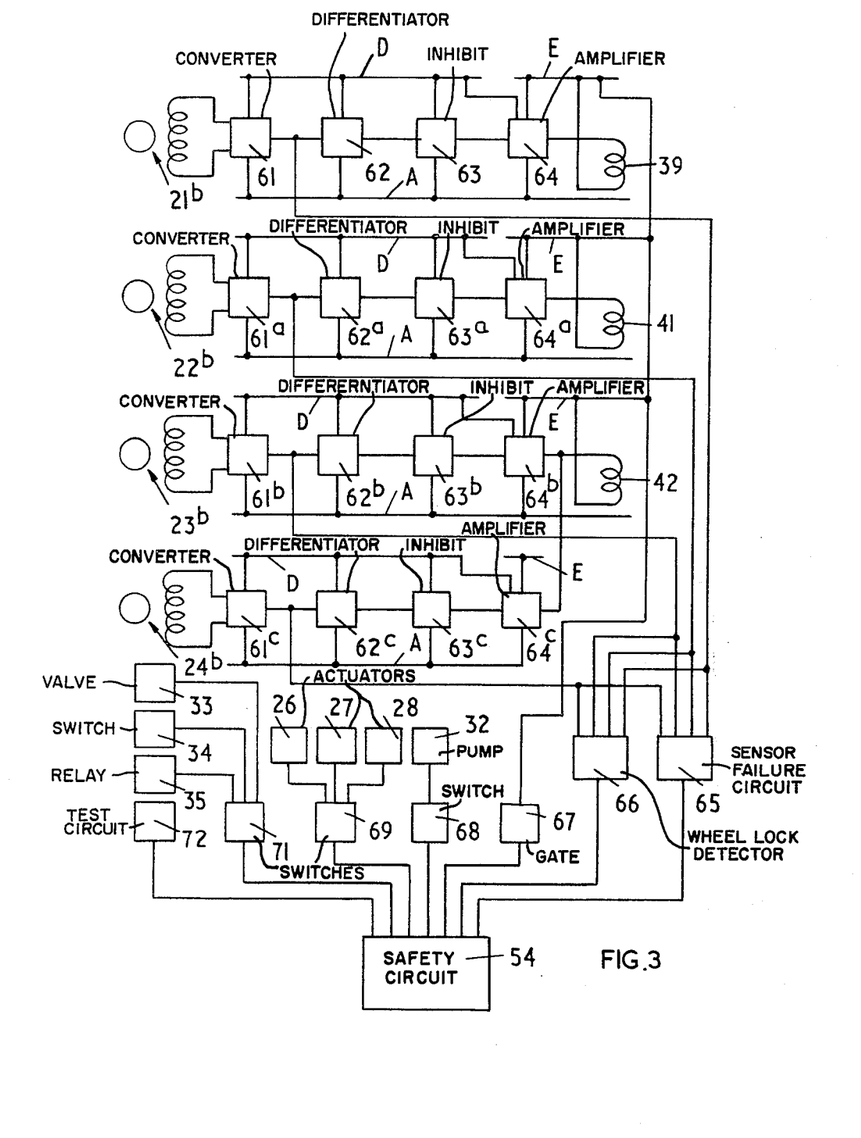
FIG. 3 is a block diagram of the wheel slide protection system.

Referring now to the block diagram of the system shown in FIG. 3, the wheel sensor 21b associated with the wheel 21 includes a toothed member driven by the wheel 21 and producing pulses in a pick-up winding at a frequency proportional to the rotational speed of the wheel. These pulses are fed to a frequency to voltage converter 61 which produces an output in the form of a voltage dependent upon the rotational speed of the wheel. This output is fed to a differentiating circuit 62, the output of which is fed through an inhibiting circuit 63 to an amplifier 64 providing power to the solenoid 39. The converter 61, differentiating circuit 62 and inhibiting circuit 63 are powered by the lines D, A, but part of the amplifier 64 and the solenoid 39 are powered by the lines E, A. When the brakes of the vehicle are applied, then if the input to the amplifier 64 indicates that the rotational deceleration of the wheel 21 is such that wheel slip is about to occur, the solenoid 39 is energised to remove the brakes 21a from the wheel 21.

The components associated with the other wheels are the same, and are indicated by the same reference numerals with the suffices a, b and c. It will, however, be noted that the amplifiers 64b, 64c both feed the solenoid 42, which removes the brakes from both rear wheels when it is energised.

The safety circuit 54 is also shown in FIG. 3, and can receive eight separate inputs. One input is from a sensor failure circuit 65 which receives inputs from the output terminals of the converters 61, 61a, 61b and 61c. A further input to the safety circuit 54 is received from a rear wheel lock detector circuit 66 which also receives inputs from the converters. A third input is received from a gate circuit 67 which detects earth faults on the solenoids 39, 41 and 42, and from a switching circuit 68 which monitors operation of the pump 32 and produces an output if the pump 32 fails. Each of the actuators 26, 27 and 28 operates a switch when it is energised, and a switching circuit 69 controlled by the switches provides another input to the safety circuit 54. Satisfactory operation of the components 33, 34 and 35 is detected by a switching circuit 71 providing a seventh input to the safety circuit 54, and the last input is from a testing circuit 72. Any one of these inputs can operate the safety circuit 54 to de-energise the relay 53 and so cut off the power supply. However, as will be explained later, some of the circuits operate with a delay, and some only when the brakes are not applied.

The various parts of the block diagram will now be described in turn.

Frequency to Voltage Converter

Figure 4:
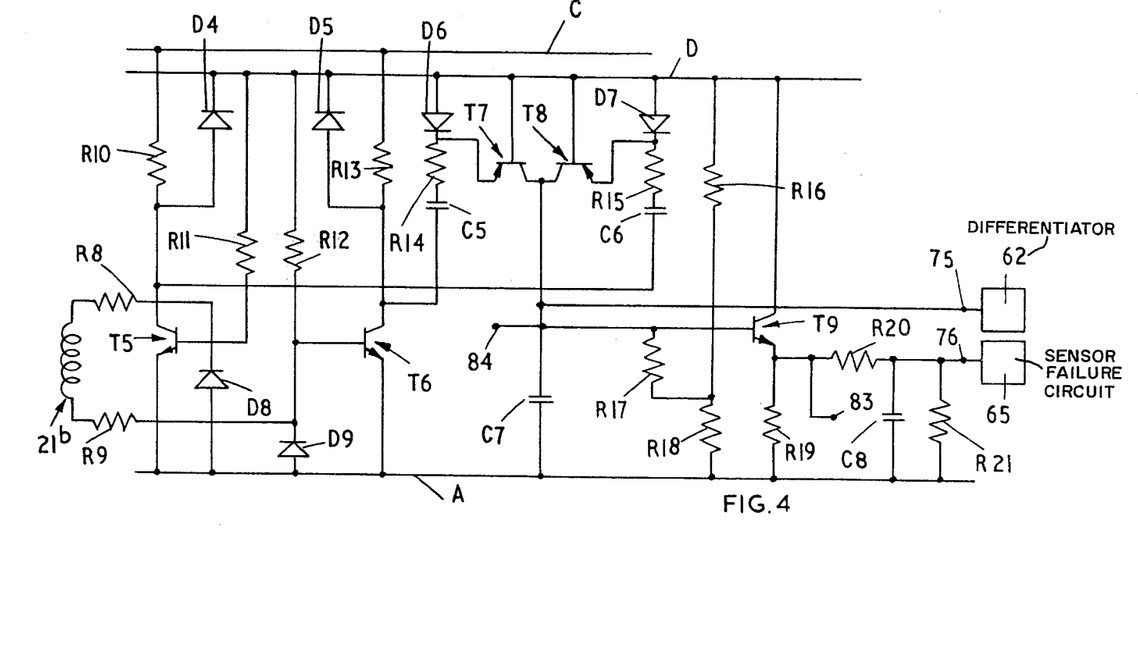
FIG. 4 is a circuit diagram illustrating the frequency to voltage converter used in the system.

As shown in FIG. 4, the converter includes a pair of n-p-n transistors T5 and T6 having their bases connected respectively through resistors R8 and R9 to the ends of the winding of the sensor 21b. The bases of the transistors T5 and T6 are also connected to the line A through diodes D8 and D9 respectively, and their emitters are also connected to the line A. The collectors of the transistors T5 and T6 are connected through resistors R10 and R13 respectively to the line C, and through diodes D4 and D5 respectively to the line D. Further connections from the bases of the transistors T5 and T6 to the line D are made through resistors R11 and R12.

The collector of the transistor T5 is connected to the line D through a capacitor C6 a resistor R15 and a diode D7 in series, and similarly the collector of a transistor T6 is connected to the line D through a capacitor C5, a resistor R14 and a diode D6 in series. The junction of the resistor R15 and the diode D7 is connected to the emitter of a p-n-p transistor T8, and the junction of the resistor R14 and diode D6 is connected to the emitter of a p-n-p transistor T7. The transistors T7, T8 have their bases connected to the line D, and their collectors connected to the line A through a reservoir capacitor C7. The converter produces across the capacitor C7 a voltage which is proportional to the rotational speed of the wheel 21. As the wheel rotates, the potential at the top of the winding will be alternately positive and negative with respect to the potential at the bottom of the winding. With the positive potential at the top of the winding, then the transistor T6 is off but the transistor T5 is on by virtue of current flowing through the resistor R8. Current now flows through the diode D7, the resistor R15, the capacitor C6 and the transistor T5, so that the capacitor C6 is charged with its top plate positive and its lower plate negative.

when the top of the winding is negative with respect to the bottom of the winding, then the transistor T5 turns off and the lower plate of the capacitor C6 is connected to the supply line C, so that the upper plate of the capacitor C6 becomes highly positive, and turns on the transistor T8, whereupon the capacitor C6 discharges into the reservoir capacitor C7. The transistor T6 is now conducting, and the capacitor C5 charges by way of the diode D6, the resistor R14 and the transistor T6. When the transistor T5 turns on again, the capacitor C5 is connected through the resistor R13 to the line C, and turns on the transistor T7, so that the capacitor C5 also discharges into the reservoir capacitor C7.

Two outputs are taken from the circuit. The first of these outputs is from the collectors of the transistors T7 and T8, and is directly to the differentiating circuit 62 as shown. Additionally the collectors of the transistors T7 and T8 are connected to the base of an n-p-n transistor T9, the base being further connected through a resistor R17 to the junction of a pair of resistors R16 and R18 connected between the lines D, A. The transistor T9 has its collector connected to the line D and its emitter connected to the line A through parallel paths, one of which contains a resistor R19 and the other of which contains a resistor R20 and a capacitor C8 in series. The capacitor C8 is bridged by a resistor R21, and the junction of the resistor R20 and capacitor C8 is connected to the sensor failure detector 65. The inputs to the further circuits 62 and 65 are indicated by terminals 75, 76 to facilitate identificatiion in subsequent drawings.

Differentiating Circuit and Amplifier

Figure 5:
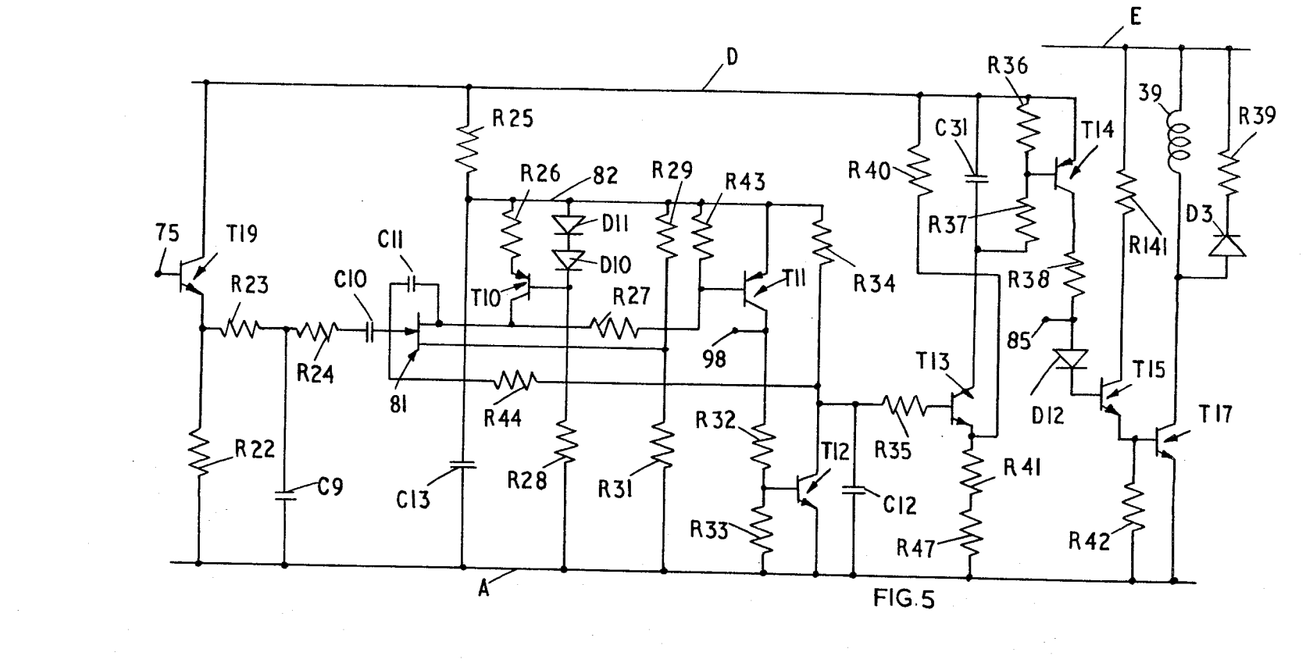
FIG. 5 is a circuit diagram illustrating a differentiating circuit and amplifier used in the system.

FIG. 5 shows the differentiating circuit and the amplifier, but ignoring the circuit 63, the purpose of which will be described later.

Referring to FIG. 5, the terminal 75 provides an input to the base of an n-p-n transistor T19 having its collector connected to the line D and its emitter connected through a resistor R22 to the line A. The emitter of the transistor T19 is further connected to the line A through a resistor R23 and a capacitor C9 in series, and the junction of the resistor R23 and capacitor C9 is connected to the gate of a field effect transistor 81 through a resistor R24 and a capacitor C10 in series. The source of the transistor 81 is connected to the junction of a pair of resistors R29, R31 connected between a line 82 and the line A. The line 82 is connected to the junction of a resistor R25 and a capacitor C13 connected in series between the lines D, A. The drain and gate of the transistor 81 are interconnected through a capacitor C11, and the drain is further connected to the collector of a p-n-p transistor T10 having its emitter connected through a resistor R26 to the line 82. The lines 82, A are bridged by a series circuit including diodes D11, D10 and R28, and the junction of the diode D10 and resistor R28 is connected to the base of the transistor T10. The collector of the transistor T10 is connected through resistors R27, R43 in series to the line 82, and the junction of the resistors R27, R43 is connected to the base of a p-n-p transistor T11 having its emitter connected to the line 82 and its collector connected to the line A through resistors R32, R33 in series. The junction of the resistors R32, R33 is connected to the base of an n-p-n transistor T12 with its emitter connected to the line A and its collector connected through a resistor R34 to the line 82. The collector and emitter of the transistor T12 are bridged by a capacitor C12, the collector of the transistor T12 is connected to the gate of the transistor 81 through a resistor R44 and the collector of the transistor T12 is connected through a resistor R35 to the base of an n-p-n transistor T13, the emitter potential of which is set by three resistors R40, R41, R47 connected in series between the lines D, A, the junction of the resistors R40, R41 being connected to the emitter of the transistor T13. The collector of the transistor T13 is connected through a pair of resistors R37, R36 to the line D, the resistors R36, R37 being bridged by a capacitor C31. The junction of the resistors R36, R37 is connected to the base of a p-n-p transistor T14 with its emitter connected to the line D and its collector connected through a resistor R38 and a diode D12 in series to the base of an n-p-n transistor T15, the collector of which is connected to the line E through a resistor R141, and the emitter of which is connected through a resistor R42 to the line A, and also to the base of an n-p-n transistor T17, the emitter of which is connected to the line A and the collector of which is connected to the line E through the solenoid 39, which is bridged by a diode D13 in series with a resistor R39.

It will be recalled that the signal at the terminal 75 is a voltage representing the rotational speed of the wheel. This voltage turns on the transistor T19, which provides an input to an amplifier constituted by the transistors 81, T10, T11 and T12, the amplifier having a feedback path between the collector of the transistor T12 and the gate of the transistor 81 by way of a resistor R44, and serving to differentiate the input and provide at the collector of the transistor T12 a signal representing the rate of change of rotational speed of the wheel. In operation, the conduction of the transistor T10 is determined by the diodes D11, D10 and the resistor R28, and the transistor T10 serves in conjunction with the transistor 81 to determine the conduction of the transistor T11, which in turn determines the conduction of the transistor T12. The potential at the collector of the transistor T12 will normally be intermediate the potentials of the lines D, A, and when the wheel decelerates the potential will approach the potential of the line D, but for acceleration will approach the potential of the line A.

The emitter potential of the transistor T13 is set by the resistors R40, R41 and R47, and normally the transistor T13 is non-conductive. During acceleration, the potential at the collector of the transistor T12 falls, and so the transistor T13 still does not conduct. However, during deceleration, the potential at the collector of the transistor T12 rises, until at a predetermined rotational deceleration of the wheel, the transistor T13 turns on. The predetermined rotational deceleration is chosen to be such that the wheel is about to slip. When the transistor T13 conducts, it provides base current to the transistor T14, which conducts to turn on the transistors T15 and T17 to energise the solenoid 39. When the wheel accelerates again, the transistor T13 is turned off and the solenoid 39 is de-energised.

In the case of the rear wheels, the transistors 17 have their collectors interconnected. As will be appreciated, if either rear wheel is about to slip, its associated transistor T13 will conduct, so that its associated transistors T14, T15, and T16 conduct and provide an input to the common rear wheel solenoid 42.

Inhibiting Circuit

The purpose of the inhibiting circuit is to prevent the brakes from being held in the release condition unnecessarily when the vehicle is travelling over a bad surface. By way of example, with a vehicle travelling over a cobbled road, a wheel will decelerate as it travels up the cobblestone, and accelerate as it travels down the cobblestone. If the vehicle is being braked at the time, then the mean rotational speed of the wheel will be decreasing, and so there will be a deceleration signal. However, superimposed upon this signal will be acceleration and deceleration signals at a much greater frequency as a result of the acceleration and deceleration caused by the cobblestones. Not only are these signals at a very high frequency, but they are at a substantial magnitude, certainly sufficient to energise the solenoid 39 in FIG. 5. Thus, if a situation is imagined in which the mean deceleration is such that the wheel is not likely to slip, so that the solenoid 39 should not be energised, nevertheless, the solenoid 39 will be energised and de-energised rapidly as a result of the high frequency signals resulting from the wheel travelling over the cobblestones. Moreover, because the brakes on a vehicle wheel take longer to apply than to release, a situation is found to be reached quickly in which the brakes are in fact held off permanently, so that the braking effort is lost.

Figure 6:
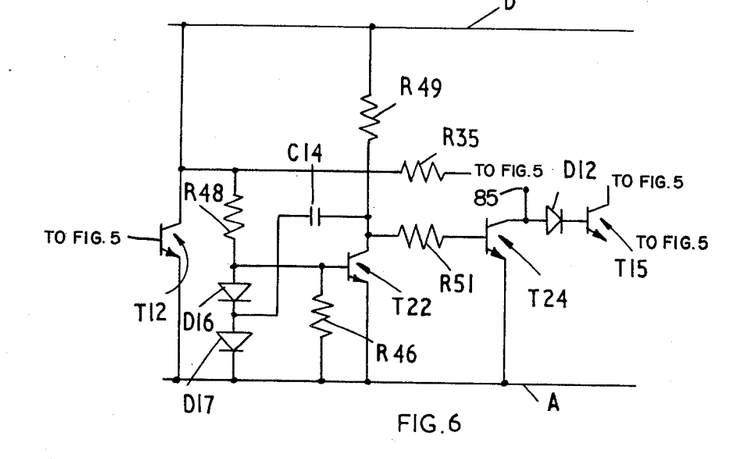
FIG. 6 is a circuit diagram illustrating an inhibition circuit used in the system.

The inhibiting circuit shown in FIG. 6 is designed to overcome this difficulty. As will be seen in FIG. 6, the circuit is connected to the collector of the transistor T12, and acts on the base of the transistor T15 in the amplifier. The inhibiting circuit includes an n-p-n transistor T22 with its emitter connected to the line A, its collector connected to the line D through a resistor R49, and its base connected through a resistor R48 to the collector of the transistor T12, through a resistor R46 to the line A, and through a pair of diodes D16, D17 in series to the line A. The collector of the transistor T22 is connected through a capacitor C14 to the junction of the diodes D16 and D17, and is further connected through a resistor R51 to the base of an n-p-n transistor T24. The transistor T24 has its emitter connected to the line A. The collector of the transistor T24 is connected to the base of the transistor T15 through the diode D12.

It will be recalled that the collector potential of the transistor T12 is normally intermediate the potentials of the lines D and A, but rises during deceleration and falls during acceleration. Normally, the transistor T22 conducts and so no base current is provided to the transistor T24 and the capacitor C14 is discharged.

When the wheel decelerates, the potential at the collector of the transistor T12 rises, but the transistor T22 remains on. If the predetermined deceleration is exceeded, and the brakes are released, then clearly the transistor T24 cannot inhibit the amplifier. When the wheel starts to accelerate again, the collector potential of the transistor T12 falls, and the transistor T22 turns off. When the transistor T22 turns off, the capacitor C14 charges by way of the resistor R49 and the diode D17, and when the capacitor C14 has charged the transistor T24 is turned on.

When the wheel accelerates, the brakes will of course be re-applied, but when the wheel decelerates again the potential at the collector of the transistor T12 rises, to a level such that, without the capacitor C14, the transistor T22 would turn on. However, at this stage, the transistor T22 is held off for a predetermined period of time by discharge of the capacitor C14, and during this predetermined period of time, current flowing through the resistors R49 and R51 holds on the transistor T24, so inhibiting the transistor T15. At the end of the predetermined period of time, the transistor T22 turns on again and the transistor T24 turns off. Thus, if the predetermined deceleration is exceeded during the predetermined period of time, the brakes will not be released. Since the frequency with which the brakes are released on a cobbled surface is much higher than the frequency with which the brakes would be released during a normal braking operation when the wheel is likely to slip, the predetermined period of time can readily be chosen such that if the wheel is on a good surface and is about to slip, then by the time the predetermined deceleration has been exceeded for the second time, the capacitor C14 will have been discharged and so the transistor T24 will be off and the brakes can be released again. However, on a cobbled surface, an attempt will be made to release the brakes again well before the capacitor C14 has discharged, and in these circumstances the required inhibition will be effected by conduction of the transistor T24.

Safety Circuit

Figure 7:
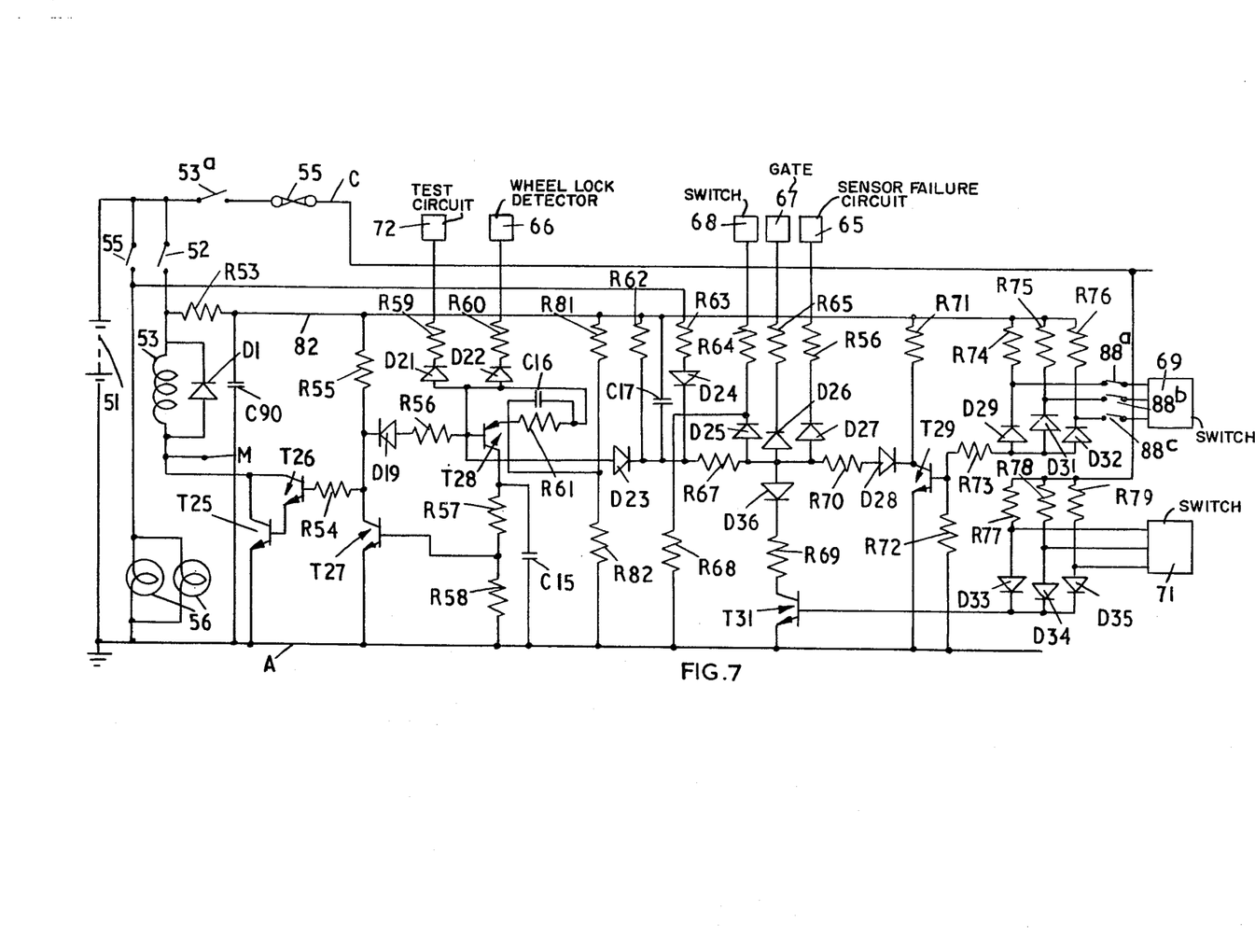
FIG. 7 is a circuit diagram illustrating the safety circuit used in the system.

FIG. 7 shows the safety circuit together with parts of FIG. 2. Moreover, the various inputs to the safety circuit 54 shown in FIG. 3 and numbered 65 to 72 are also identified in FIG. 7, although as will become apparent from the description, FIG. 3 is a purely diagrammatic illustration, and some of the circuits 65 to 72 are in fact simply connections or switches.

Referring to FIG. 7, the lower end of the relay winding 53 is connected to the collector of an n-p-n transistor T25 the emitter of which is connected to the line A. The terminal M is connected to a monitoring unit (to be described with reference to FIG. 11) which illuminates a warning lamp whenever the relay winding 53 is not energised. The transistor T25 has its base connected to the emitter of an n-p-n transistor T26, the collector of which is connected to the collector of the transistor T25 and the base of which is connected through a resistor R54 to the collector of an n-p-n transistor T27 with its emitter connected to the line A and its collector connected through a resistor R55 to a supply line 82 which is connected to the line A through a capacitor C90, and through a resistor R53 to the junction of the ignition switch 52 and winding 53. The collector of the transistor T27 is further connected through a diode D19 and a resistor R56 in series to the base of p-n-p transistor T28, the collector of which is connected to the line A through parallel paths one of which contains a pair of resistors R57 and R58 in series, and the other of which contains a capacitor C15, the junction of the resistors R57 and R58 being connected to the base of the transistor T27. The base of the transistor T28 is connected to the anodes of a pair of diodes D21 and D22, the anodes being further connected to the emitter of the transistor T28 through a resistor R61 and a capacitor C16 in parallel. The cathodes of the diodes D21 and D22 are connected respectively to the circuits 72 and 66 through resistors R59 and R60.

The base of the transistor T28 is further connected through a diode D23, a resistor R67, a resistor R70 and a diode D28 in series to the collector of a transistor T29, the transistor T29 having its emitter connected to the line A and its collector connected to the line 82 through a resistor R71. The junction of the diode D23 and resistor R67 is connected to the line 82 through parallel paths containing respectively a resistor R62 and a capacitor C17, and is also connected through a diode D24 and resistor R63 in series to the junction of the brake lamp switch 55 and the brake lamps 56. The junction of the resistors R67 and R70 is connected to the anodes of three diodes D25, D26 and D27, the cathodes of which are connected through resistors R64, R65 and R66 respectively to the circuits 68, 67 and 65. The junction of the resistor R64 and diode D25 is connected to the line A through a resistor R68. The junction of the resistors R67 and R70 is further connected through a diode D36 and a resistor R69 in series to the collector of an n-p-n transistor T31, the emitter of which is connected to the line A and the base of which is connected to the cathodes of three diodes D33, D34 and D35. The anodes of the diodes D33, D34 and D35 are connected through resistors R77, R78 and R79 respectively to the line C, and the junctions are further connected to the circuit 71.

The base of transistor T29 is connected through a resistor R72 to the line A, and through a resistor R73 to the cathodes of three diodes D29, D31 and D32. The anodes of the diodes D29, D31 and D32 are connected to the line 82 through resistors R74, R75 and R76 respectively, and are also connected to the circuit 69. Finally, the emitter of the transistor T28 is held at a constant potential by virtue of a connection from the emitter to the junction of a pair of resistors R81, R82 connected between the lines 82, A.

The various possible faults which are monitored by the safety circuit will now be considered. The circuit 67 is in effect simply a connection to the lines E, as shown in FIG. 3. It will be seen from FIG. 3 that the lower ends of the solenoids are connected to the line E, but if for any reason one of the solenoids should have, its lower end short-circuited to earth, then current flows from the line 82 through the capacitor C17 the resistor R67, the diode D26 and the resistor R65 to earth, and so the capacitor C17 starts to charge. The transistor T28 has its emitter held at a constant potential, and the capacitor C17 has its voltage applied to the base of the transistor T28 by virtue of the diode D23. After a delay predetermined by the resistors R67, R65, the capacitor C17 charges sufficiently to turn on the transistor T28, which provides base current to the transistor T27. Conduction of the transistor T27 turns off the transistors T26 and T25, so that the relay 53 is de-energised. Moreover, once the transistor T27 and the transistor T28 are on, current can flow through the resistor R56 and diode D19 to keep the transistors T27, T28 on. Thus, once a fault has been detected, the winding 53 can only be energised again by opening the ignition switch and then closing the ignition switch again.

The fault detection described above only takes place if the brakes are not applied. If the brakes are applied, then the connection by way of resistor R63 and diode D24 stops the capacitor from charging. This inhibition applies to the faults detected by all the circuits 65, 67, 68, 69 and 71.

The circuit 65, which will be described later, detects a fault of any of the wheel sensors, and if such a fault occurs provides a connection to earth. The circuit 68 is simply a switch operated by the pump 32 and serving to provide an earth connection if the pump fails. The three circuits 65, 67, 68 all operate in exactly the same way, although the delays associated with each of these circuits can be different by choosing suitable values for the resistors R64, R65 and R66.

The circuit 69 in effect consists simply of three switches operated by the three actuators. Whenever one of the actuators operates, its appropriate switch operates to connect the anode of one of the diodes D29, D31 or D32 to a positive supply line. Thus, as soon as an actuator is operated, base current flows to the transistor T29 to turn the transistor T29 on. The capacitor C17 now charges through the resistor R70 the diode D28 and the transistor T29 and after a predetermined delay the capacitor C17 turns on the transistors T28, T27 so that the transistor T25 turns off as previously described.

The circuit 71 effectively consists of three switches operated by the pressure in the supply line 31. If any failure occurs, then the anode of one of the diodes D33, D34 or D35 is connected to a positive supply line and turns on the transistor T31. The capacitor C17 now charges through the resistor R67 the diode D36 and the resistor R69, and again after the predetermined delay the transistors T27 and T28 turn on and the transistor T25 turns off.

All the above faults are monitored only when the brakes are not applied, but there are two faults that are monitored whether the brakes are applied or not. These faults are controlled by the circuits 66 and 72, both of which will be described later. The circuit 66 detects locking of the rear wheels, and if this should happen connects the cathode of the diode D22 to a negative supply line, so that the transistors T28, T27 are turned on without a delay, the transistor T25 again being turned off. The testing circuit 72 similarly connects the cathode of diode D21 to a negative supply line if the testing circuit indicates that something is faulty. Once again, the transistors T28, T27 are turned on to turn the transistor T25 off and de-energise the winding 53.

Sensor Failure Circuit

Figure 8:
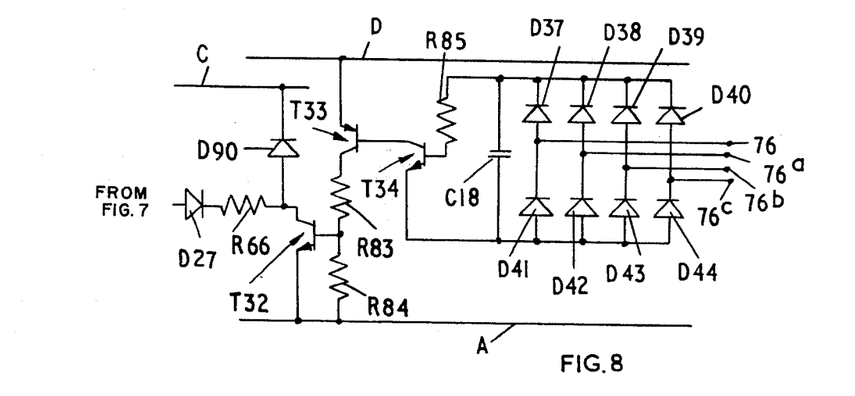
FIG. 8 is a circuit diagram illustrating the wheel speed sensor failure detection circuit.

Referring to FIG. 8, the series connection of diode D27 and R66 which is shown in FIG. 7 completes a connection to the collector of an n-p-n transistor T32, the collector of which is also connected through a diode D90 to the line C. The emitter of transistor T32 is connected to the line A and the base is connected to the junction of a pair of resistors R83, R84 connected in series between the collector of a p-n-p transistor T33 and the line A. The transistor T33 has its emitter connected to the line D and its base connected to the collector of n-p-n transistor T34, the emitter of which is connected to the anodes of four diodes D41, D42, D43, D44, and the base of which is connected to the cathodes D37, D38, D39 and D40 through a resistor R85. The cathodes of the diodes D37, D38, D39 and D40 are connected to the anodes of the diodes D41, D42, D43, D44 through a capacitor C18, and the diodes are connected in pairs with the anode of the diode 37 and the cathode of the diode D41 being connected to a terminal 76, and similar connections being made between the other diode pairs and terminals 76a, 76b, and 76c. The terminal 76 is the terminal seen in FIG. 4, and the terminals 76a, 76b and 76c are the equivalent terminals in the other three frequency to voltage converters.

The arrangement is such that provided all the sensors are operating satisfactorily, then each wheel will be rotating at the same speed, and the base and emitter of the transistor T34 will be at substantially the same potential. However, if one of the wheels should rotate at a different speed from the others, then a potential will be developed between the base and emitter of the transistor T34 to turn the transistor T34 on. The transistor T34 now provides base current to the transistor T33, which in turn provides base current to the transistor T32, completing an earth return path through the diode D27 and resistor R66, so turning off the transistor T25 in FIG. 7 as previously explained. The circuit can be designed to operate at a predetermined difference between the rotational speeds of any pair of wheels by suitably choosing the resistors R20 and R21 in FIG. 4. The diode D90 turns off the transistor T25 if the fuse 50 blows.

Rear Wheel Lock Detection Circuit

Figure 9:
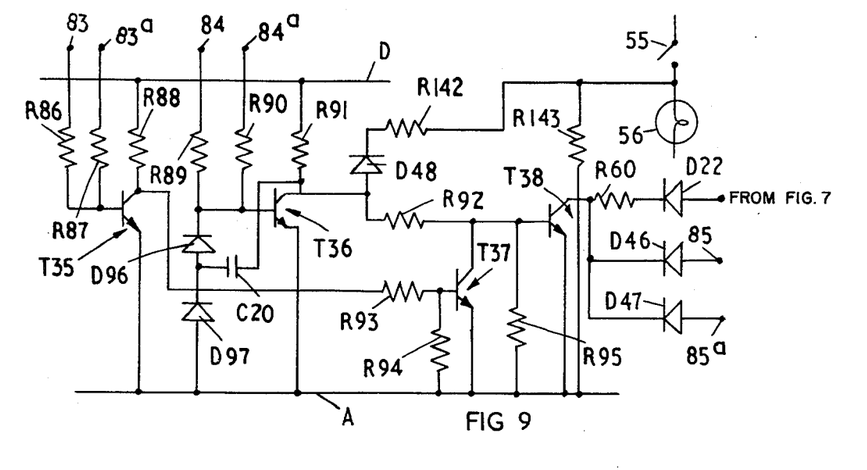
FIG. 9 is a circuit diagram illustrating the rear wheel lock detection circuit.

Referring to FIG. 9, the rear wheel lock detection circuit includes an n-p-n transistor T35 having its emitter connected to the line A and its base connected through resistors R86 and R87 respectively to terminals 83, 83a. The collector of the transistor T35 is connected to the line D through a resistor R88, and is further connected through a resistor R93 and a resistor R94 in series to the line A, the junction of the resistors R93, R94 being connected to the base of an n-p-n transistor T37 with its emitter connected to the line A. There is further provided an n-p-n transistor T36 having its emitter connected to the line A and its base connected through resistors R89 and R90 respectively to terminals 84, 84a, and through diodes D96, D97 in series to the line A. The collector of the transistor T36 is connected to the junction of the diodes D96, D97 through a capacitor C20, and is further connected through a resistor R91 to the line D, and through a resistor R92 to the base of an n-p-n transistor T38. The transistor T38 has its emitter connected to the line A and its base connected to the line A through a resistor R95 in parallel with the collector-emitter of the transistor T37. The collector of the transistor T38 provides an input to the safety circuit by way of the resistor R60 and diode D22 shown in FIG. 7, and is also connected through diodes D46 and D47 respectively to terminals 85 and 85a.

The terminals 84 and 84a are connected to the frequency to voltage converters associated with the rear wheels. The position of the terminals 84 is indicated in FIG. 4, and it will be seen that the base of the transistor T36 receives a signal direct from the appropriate capacitor C7 in the rear wheel frequency to voltage converter, so that the base potential of the transistor T36 is dependent upon the rotational speed of the rear wheels. The terminals 83 and 83a are connected to the frequency to voltage converters associated with the front wheels respectively. The position of the terminal 83 is also shown in FIG. 4, and it will be seen that since the terminal 83 is connected to the emitter of the transistor T9 in the appropriate frequency to voltage converter, the potential at terminal 83 will, for a given wheel speed, be slightly less than the potential at the terminal 84. The reason for this will become apparent. It should also be noted that the collector of the transistor T36 is connected through a diode D48 and a resistor R142 in series to the junction of the brake lamp switch 55 and lamps 56, this junction also being connected through a resistor R143 to the line A.

In operation, provided that the front wheels of the vehicle are rotating at a speed corresponding to a low vehicle speed of the order of 5 m.p.h. then the transistor T35 is on, and removes base current from the transistor T37, which is therefore off and can be ignored. If the vehicle brakes are not applied, then the diode D48 can conduct current flowing through the resistor R91 by way of the lamps 56, this current being insufficient to illuminate the lamps 56 but serving to ensure that the transistor T38 does not conduct, so that the circuit is in effect inoperative. The resistor R143 provides this current path in the event of the lamps 56 being broken. However, assuming that the brakes of the vehicle are applied, then the switch 55 is closed and the diode D48 is reverse biased and plays no part in the operation of the circuit. The resistor R142 protects diode D48 from transient voltages. Rotation of the rear wheels produces signals at the terminals 84 and 84a serving to hold the transistor T36 on, and so current flowing through the resistor R91 flows through the transistor R36, and the transistor T38 is off. At the same time, the capacitor C20 is discharged. Thus, in normal operation the transistor T38 never turns on. However, if for any reason the system fails to operate on the rear wheels, then when both of the rear wheels start to slip, base drive is removed from the transistor T36, and after a short delay during which the capacitor C20 charges, the transistors T36 turns off, and current flowing through the resistor R91 now flows through the resistor R92 to turn on the transistor T38. Conduction of the transistor T38 provides a path to earth through the diode D22, and as previously explained with reference to FIG. 7 has the effect of turning off the transistor T25 so that the relay winding 53 is de-energised. Conduction of the transistor T38 also provides a path to earth from the terminals 85 and 85a, which are associated with the amplifiers controlling the front wheels of the vehicle. The position of the terminal 85 is indicated in FIG. 5, and it will be seen that conduction of the diode D46 effectively shunts the base current of the transistor T15 in FIG. 5 to earth so that the transistor T15 cannot conduct. The equivalent transistor T15 in the amplifier associated with the other front wheel will also cease to conduct, so that the circuits to the front wheel solenoids are disconnected.

The purpose of the capacitor C20 is to ensure that if the rear wheels lock momentarily during the braking operation, then the transistor T36 will remain on and the transistor T38 will not conduct. Momentary locking of the rear wheels is acceptable, but if the rear wheels should lock as a result of a fault, and the system still operates to release and then re-apply the brakes in the usual way to the other wheels, it is possible for the vehicle to be subjected to a large turning couple which can cause the entire vehicle to spin.

When the vehicle is coming to rest normally, then the transistor T36 will turn off, although of course it is not required to turn on the transistor T38. It will be recalled that the signal at the terminals 83 and 83a is, for a given rotational speed of a wheel, somewhat less than the signal at the terminals 84 and 84a. For this reason, when the vehicle is coming to rest, the transistor T35 turns off before the transistor T36. When the transistor T35 turns off, the transistor T37 turns on, and so when the transistor T36 is turned off, the transistor T38 is not turned on because current flowing through the resistor R92 flows through the transistor T37.

The purpose of inhibiting the circuit except during braking, by means of the diode D48, is to prevent a false indication being given if the front wheels on a front wheel drive vehicle slip during acceleration.

The purpose of the diodes D96 and D97 is to cater for the possibility that all the vehicle wheels lock transiently and then release simultaneously. Should this happen, with-out the diodes D96 and D97 it is possible for the transistor T38 to oreceive base current transiently and turn on. However, in the circumstances and diode D97 is forward biased and the diode D96 is reversed biased, so that the collector potential of the transistor T36 is allowed to fall rapidly, and in effect the capacitor C20 is inhibited. As a result, the transistor T38 cannot receive base current transiently, and the problem is overcome. In normal operation, the diode D96 is forward biased and the diode D97 is reverse biased, and the capacitor C20 acts in the manner described.

Testing Circuit

Figure 10:
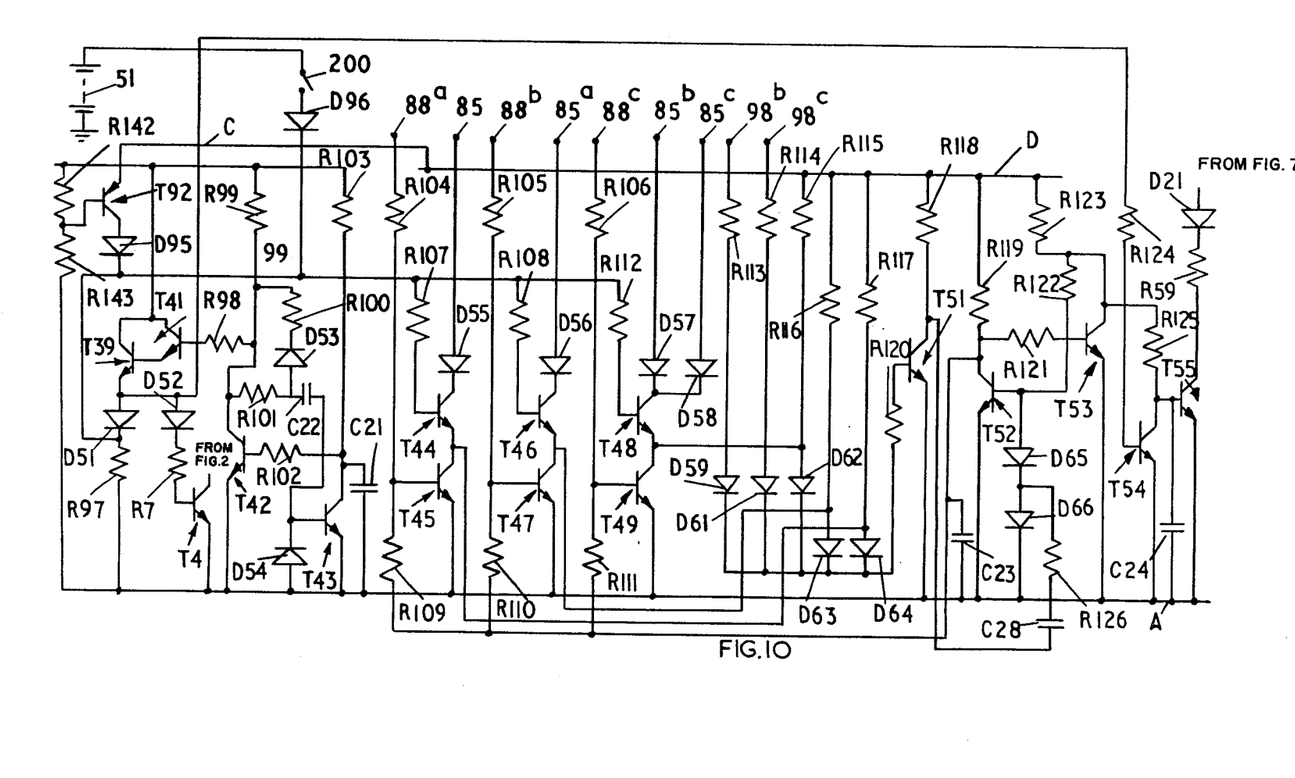
FIG. 10 is a circuit diagram illustrating the testing circuit used in the system.

The testing circuit, which incorporates a timing network, is shown in FIG. 10. Considering first the timing network, there is provided an n-p-n transistor T39 having its base connected to the emitter of an n-p-n transistor T41, the collectors of the transistors T39 and T41 being connected to the line C. The transistor T39 has its emitter connected through a diode D51 and a resistor R97 in series to the line A, and the emitter is further connected through a diode D52 and the resistor R7 in series to the base of the transistor T4 shown in FIG. 2, so that when the transistor T39 is conducting, the transistor T4 is turned on by current flowing through the diode D52 and resistor R7. The junction of the diode D51 and resistor R97 is also connected to a supply line 99, so that the line 99 is energised when the transistor T39 is on.

The base of the transistor T41 is connected through resistors R98, R99 in series to the line C, and the junction of the resistors R98, R99 is connected to the collector of an n-p-n transistor T42 with its emitter connected to the line A and its base connected through a resistor R102 to the collector of an n-p-n transistor T43. The transistor T43 has its emitter connected to the line A, its collector connected to the line A through a capacitor C21, its collector also connected through a resistor R103 to the line C and its base connected through a diode D54 to the line A, and through a capacitor C22 and a resistor R101 in series to the collector of the transistor T42. The junction of the capacitor C22 and resistor R101 is connected through a diode D53 and a resistor R100 in series to the junction of the resistors R98, R99.

The remainder of the testing circuit includes three pairs of transistors T44, T45, T46, T47, T48, T49. The transistors T44, T46 and T48 have their emitters connected respectively to the collectors of the transistor T45, T47 and T49, and the emitters of the transistors T45, T47, T49 are connected to the line A. The bases of the transistors T45, T47 and T49 are connected through resistors R104, R105, R106 to terminals 88a, 88b, 88c, and the bases of the transistors T44, T46, T48 are connected through resistors R107, R108, R112 to the line 99. The collectors of the transistors T44 and T46 are connected through diodes D55 and D56 respectively to terminals 85 and 85a, and the collector of the transistor T48 is connected through diodes D57 and D58 to terminals 85b, 85c.

There is further provided an n-p-n transistor T51 having its emiter connected to the line A and its collector connected through a resistor R118 to the line D. The base of the transistor T51 is connected through a resistor R120 to the cathodes of five diodes D59, D61, D62, D63 and D64. The diodes D59, D61 have their anodes connected through resistors R113 and R114 respectively to terminals 98b, 98c, whilst the diodes D62, D63 and D64 have their anodes connected through resistors R115, R116 and R117 respectively to the line D. The junctions of the resistors R115, R116 and R117 and their respective diodes D62, D63, D64 are connected respective to the collectors of the transistors T49, T47 and T45. The collector of the transistor T51 is further connected through a capacitor C28 and a resistor R126 in series to the junction of a pair of diodes D65, D66 connected in series between the base of an n-p-n transistor T52 and the line A. The transistor T52 has its emitter connected to the line A and its collector connected through a resistor R119 to the line D, the collector further being connected through a capacitor C23 to the line A, and through resistors R109, R110 and R111 respectively to the bases of transistors T45, T47 and T49. The base of the transistor T52 is connected through a resistor R122 to the collector of an n-p-n transistor T53, the emitter of which is connected to the line A, the collector of which is connected to the line D through a resistor R123 and the base of which is connected through a resistor R121 to the collector of the transistor T52. The collector of the transistor T53 is connected through a resistor R125 to the collector of an n-p-n transistor T54 with its emitter connected to the line A and its collector connected through a capacitor C24 to the line A, and also to the base of an n-p-n transistor T55. The transistor T55 has its emitter connected to the line A and its collector connected through the series circuit R59, D21 to the safety circuit shown in FIG. 7. The base of the transistor T54 is connected through a resistor R124 to the emitter of the transistor T39.

It will be recalled in connection with FIG. 7 that if the transistor T55 conducts at any time then the relay winding 53 is de-energised. When the ignition switch is first closed, the supply lines C, D are energised and current flowing through the resistors R99, R98 turns on the transistors T41, T39. The capacitor C21 holds the transistor T42 off initially. Current also flows through the resistor R101 and the capacitor C22 to turn on the transistor T43, but after a predetermined period of time, the capacitor C22 is charged and the transistor T43 turns off. When the transistor T43 turns off, base current flows to the transistor T42, which turns on to remove base current from the transistors T41 and T39, so that the transistors T41, T39 turn off. Thus, the timing circuit works for a predetermined period of time, typically 1 second, to supply power to the line 99, and also to hold on the transistor T4. Because the transistor T4 is held on, power is supplied not only to the line B, but also to the line E which feeds the amplifiers, even though the brake pedal of the vehicle is not depressed at this stage.

When the timer is operating during the 1 second period, current flowing through the resistor R124 turns on the transistor T54. Current flowing through the resistors R124 and R125 can now flow through the transistor T54, and so during the 1 second period, the transistor T55 cannot be turned on.

The purpose of the circuit is to check the operation of the wheel slide protection system during the 1 second period, and to prevent the system from coming into operation if any one of a number of predetermined faults are detected.

During the delay period, it is desired to simulate a deceleration signal which will cause the actuators to operate. This can be done by feeding a suitable signal into the respective amplifiers, but using the arrangement shown, when the circuit is first connected to the supply, until the various components settle down each amplifier will in fact receive a signal simulating deceleration beyond the perdetermined maximum, so that each of the actuators will be operated. It will of course be appreciated that actuator operation is permitted by virtue of the connection through diode D52 to the base of the transistor T4. It will be recalled that each actuator has associated therewith a switch, and these switches serve when the actuators are operated to provide positive signals to the terminals 88a, 88b and 88c, the terminal 88c being connected to the actuator for the rear wheels. When the terminals 88a, 88b, 88c receive their signals, the transistors T45, T47 and T49 are turned on, and since the line 99 is energised at this moment, the transistors T44, T46 and T48 also turn on. Conduction of the transistor T44 serves through the diode D55 to connect the terminal 85 to earth. The terminal 85, it will be recalled, is shown in FIG. 5, and when it is connected to earth it clamps the base of the transistor T15 in the amplifier associated with one of the front wheels, so that the solenoid 39 is de-energized and the actuator will start to return to its rest position. Similarly, the diode D56 will clamp the amplifier associated with the other front wheel, and the diodes D57 and D58, both operated by the transistor T48, will clamp the two amplifiers associated with the rear wheels. The movement of the actuators during the 1 second delay period does not significantly affect the operation of the vehicle braking system.

When all the transistors T44, T45, T46, T47, T48 and T49 are conducting, current flowing to the base of the transistor T51 through the diodes D62, D63 and D64 is diverted through the transistors T45, T47 and T49, but the transistor T51 only turns off if no current is received from the diodes D59 or D61 either. The diodes D59 and D61 receive their inputs from terminals 98b, 98c, and the position of the terminal 98 is shown in FIG. 5. The terminal 98 is associated with one of the rear wheel differentiating circuits, and it will be seen that provided the rear wheel differentiating circuit is operating, the potential at the terminal 98b will fall to zero during the 1 second period and so the signal by way of the diode D59 disappears. The terminal 98c is of course associated with the other rear wheel differentiating circuit, and so provided both differentiating circuits associated with the rear wheels and all the actuators are operating satisfactorily, then during the delay period, the transistor T51 turns off.

As soon as the actuator switch is closed again, which will happen if the system is working satisfactorily because the amplifier is stopped from operating by the diodes D55, D56, D57 and D58, then even though the rear wheel differentiating circuits are operating satisfactorily, base current is restored to the transistor T51 by way of the diodes D62, D63, D64 and the transistor T51 turns on again. While the transistor T51 is off, the transistors T52 and T53 are on and off respectively. The capacitor C23 prevents conduction of the transistor T53 when the ignition switch closes. However, when the transistor T51 turns on again, the bi-stable circuit constituted by the transistors T52 and T53 and their associated components switches so that the transistor T53 is on and the transistor T52 is off. When the transistor T52 turns off, current flowing through the resistor R119 now flows through the resistors R109, R110 and R111 to hold the transistors T45, T47 and T49, so that the transistors T44, T46 and T48 can remain conductive until the power supply is removed from the line 99, and the diodes D55, D56, D57 and D58 stop the amplifiers from working for the rest of the delay period.

A situation has now been reached where a number of operations have been checked during the delay period, and as a result of the check being successful, the circuit is left in a state with the transistor T53 on. At the end of the delay period, the transistors T39 and T41 turn off as previously explained, and so base drive is removed from the transistor T54. However, the transistor T53 is now conducting and removes base current from the transistor T55, so that the transistor T55 does not conduct. The capacitor C24 prevents the transistor T55 from conducting transiently at the beginning of the check period.

In the event of any of the checks being unsuccessful, then the required cycle is not carried out, and the transistor T51 does not turn off and on again. In these circumstances, the bi-stable circuit remains in its normal state with the transistor T52 conducting and the transistor T53 off. At the end of the delay period, the transistor T54 goes off and current flows through the resistors R123 and R125 to turn on the transistor T55, so that the relay winding is de-energised and the wheel slide protection system does not operate, leaving the normal braking system of the vehicle in operation.

Figure 11:
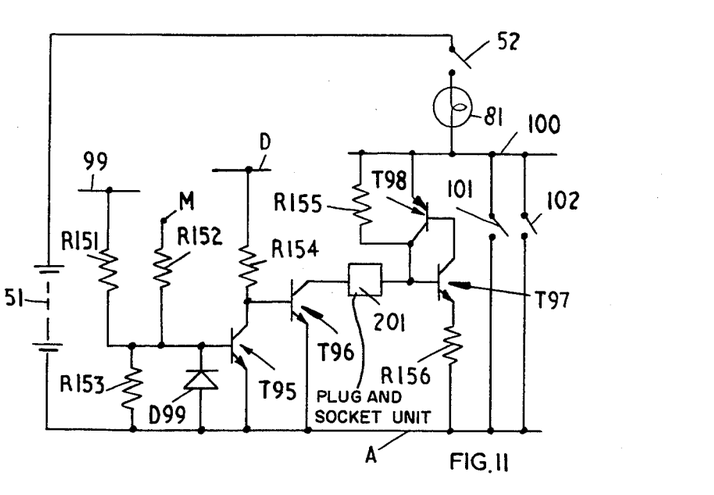
FIG. 11 is a circuit diagram of a monitoring unit used in the system.

FIG. 10 also shows the number of components which are associated with the monitoring unit shown in FIG. 11. Thus, the line 99 is connected to the positive terminal of the battery 51 through the cathode-anode path of a diode D96 and a starter switch 200 of the vehicle. Whenever the starter switch 200 is closed to start the vehicle, the line 99 will assume a positive potential. Also, connected in series between the lines C, A are a pair of resistors R142, R143, the junction of which is connected to the base of a p-n-p transistor T92 having its collector connected through a diode D95 to the line 99, and its emitter connected to the line D. The base potential of the transistor T92 is set by the resistors R142 and R143, and provided that the line D is at the correct potential, 11 transistor T92 is not conductive. However, if the potential on the line D falls below a predetermined level, typically 11 volts, then the transistor T92 will conduct and the line 99 will assume a positive potential. Thus, it will be noted that in FIG. 10 the line 99 is at a positive potential during the delay period, when an attempt is made to start the engine, or when the stabilised voltage supply falls below 11 volts.

Monitoring Unit

Referring to FIG. 11, the positive terminal of the battery 51 is connected through the ignition switch 52 of the vehicle and a warning lamp 81 in series to a supply line 100 which is coupled to the line A through switches 101, 102 in parallel. The line 100 is also connected to the emitter of a p-n-p transistor T98 the base of which is connected to the collector of an n-p-n transistor T97 having its emitter connected to the line A through a resistor R156. The base of the transistor T97 and the collector of the transistor T98 are interconnected and connected to the line 100 through a resistor R155, and the base of the transistor T97 is further connected through a plug and socket unit 201 to the collector of an n-p-n transistor T96 having its emitter connected to the line A and its base connected through a resistor R154 to the line D. The transistor T96 also has its base connected to the collector of an n-p-n transistor T95, the base of which is connected to the line A through a resistor R153 and a diode D99 in parallel, and the base of which is further connected through resistors R152 and R151 respectively to the terminal M (FIG. 2) and the line 99 (FIG. 10).

The switches 101, 102 are closed respectively when the handbrake of the vehicle is applied, and when the level of fluid in the brake fluid reservoir falls below a predetermined position. Closing of either switch 101, 102 eliminates the lamp 81. As will be appreciated, any number of switches can be provided in parallel to give a driver a warning. Other switches which can be used in some vehicles are pad wear switches, which indicate when the brake pads have warn, and a pressure differential switch, which in a system with a dual hydraulic circuit closes if the pressures in the two circuits are different.

The lamp 81 is also illuminated if the transistor pair T98, T97 is on. The transistor pair T97, T98 is turned on by current flowing through the resistor R155 unless this current is diverted by way of the unit 201 and the transistor T96. The transistor T96 is normally held conductive by current flow through the resistor R154, so that the transistor pair T97, T98 is off. However, if there is a fault in the system resulting in a potential at the terminal M, then the transistor T95 turns on to remove base current from the transistor T96, so that the lamp 81 is illuminated. The transistor T95 will also be turned on when there is a potential on the line 99, and it will be recalled with reference to FIG. 10 that this happens during the delay period, when the engine is being started, and if the potential on the line D falls below a predetermined value. In all these circumstances, the transistor T95 is turned on, the transistor T96 is turned off and the transistor pair T97 and T98 is turned on to illuminate the lamp 81.

The unit 201 includes a number of plug and socket connections which are used in the system. If any of these plug and socket connections become disconnected, then the transistor pair T97 and T98 is turned on by current flowing through the resistor R155. The unit 201 may include connection means for actually connecting the controller to the vehicle, so that the lamp 81 is also illuminated if the controller is removed from the vehicle.

Obviously, a large number of modifications can be made in the overall system. Thus, if the preferred example there are three actuators and four wheel sensors. It would not be difficult to arrange to have four actuators in such an arrangement if this was thought desirable for a particular application. Also, instead of two rear wheel speed sensors, a single rear sensor could be used operating on the drive to the rear wheels. If desired, only two actuators could be employed, one for the rear wheels and one for the front wheels, and in this case there could either be two wheel speed sensors or four wheel speed sensors, again depending on the application.

In the case of the sensor failure circuit, it is not essential to inspect the outputs of the frequency to voltage converters, although this is preferred since the operation of the frequency to voltage converter is checked automatically at the same time. However, the sensor output could be compared with each other in other ways, either as a d.c. circuit or an a.c. circuit.

I claim:

1. A road vehicle braking system incorporating wheel slide protection, comprising in combination first and second sensors associated respectively with first and second wheels of the vehicle and producing first and second a.c. signals at frequencies dependent on the rotational speeds of the first and second vehicle wheels respectively, first and second frequency to voltage converters for producing from said first and second a.c. signals first and second d.c. signals dependent on said rotational speeds of the first and second vehicle wheels respectively, first and second differentiating circuits to which the first and second d.c. signals are fed respectively, the differentiating circuits producing output signals dependent on the rotational decelerations of the first and second wheels, means operable by way of the output signals from the first and second differentiating circuits for releasing the brakes applied to the first and second wheels respectively, when the output signals from the first and second differentiating circuits exceed predetermined values, and monitoring means operable to compare the outputs from the first and second sensors and in the event of a difference in the outputs of the first and second sensors to prevent releasing of the brakes of the first and second wheels during a subsequent braking operation, the output signals of the sensors being compared with each other by sampling the output signals of the first and second frequency to voltage converters, the output signals from the converters being applied to a bridge network which produces an output when the output signals from the converters are not equal.

2. A system as claimed in claim 1 in which more than two sensors are provided, or the sensors providing inputs to the bridge network so that if any two inputs to the bridge network differ in potential by a predetermined amount, the bridge network produces an output signal.

3. A road vehicle braking system incorporating wheel slide protection, comprising in combination first and second sensors associated respectively, with first and second wheels of the vehicle and producing first and second a.c. signals at frequencies dependent on the rotational speeds of the first and second vehicle wheels respectively, first and second frequency to voltage converters for producing from said first and second a.c. signals first and second d.c. signals dependent on said rotational speeds of the first and second vehicle wheels respectively, first and second differentiating circuits to which the first and second d.c. signals are fed respectively, the differentiating circuits producing output signals dependent on the rotational decelerations of the first and second wheels, means operable by way of the output signals from the first and second differentiating circuits for releasing the brakes applied to the first and second wheels respectively when the output signals from the first and second differentiating circuits exceed predetermined values, first and second diodes, the anode of the first diode and the cathode of the second diode being connected to the output from the first differentiating circuit, third and fourth diodes, the anode of the third diode and the cathode of the fourth diode being connected to the output of the second differentiating circuit, a line connected to the cathodes of the first and third diodes, a line connected to the anodes of the second and fourth diodes, a transistor having its base connected to one of said lines and its emitter connected to the other of said lines, and a control network coupled to the collector of said transistor and operable by current flow in the collector of said transistor, said control network serving when said transistor conducts to prevent releasing of the brakes during a subsequent braking operation.

* * * * *